US012587326B2

(12) United States Patent
Sun et al.

(10) Patent No.:     US 12,587,326 B2
(45) Date of Patent:       Mar. 24, 2026

(54) PERFORMING PHYSICAL UPLINK SHARED CHANNEL TRANSMISSIONS WITH IMPROVED RELIABILITY

(71) Applicant: Apple Inc., Cupertino, CA (US)

(72) Inventors: Haitong Sun, Irvine, CA (US); Yushu Zhang, Beijing (CN); Hong He, Cupertino, CA (US); Wei Zeng, San Diego, CA (US); Dawei Zhang, Saratoga, CA (US); Chunxuan Ye, San Diego, CA (US); Oghenekome Oteri, San Diego, CA (US); Sigen Ye, Whitehouse Station, NJ (US); Weidong Yang, San Diego, CA (US); Chunhai Yao, Beijing (CN); Jie Cui, San Jose, CA (US); Yang Tang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/408,522

(22) Filed: Jan. 9, 2024

(65) Prior Publication Data

US 2024/0146475 A1      May 2, 2024

Related U.S. Application Data

(63) Continuation of application No. 17/437,676, filed as application No. PCT/CN2020/119785 on Oct. 2, 2020, now Pat. No. 11,909,677.

(51) Int. Cl.
H04L 5/00           (2006.01)

(52) U.S. Cl.
CPC ................................. H04L 5/0035 (2013.01)

(58) Field of Classification Search
CPC ...................................................... H04L 5/0035
(Continued)

(56) References Cited

U.S. PATENT DOCUMENTS 11,909,677 B2 *    2/2024    Sun ....................... H04L 5/0035
2014/0192736 A1    7/2014    Jeong
(Continued)

FOREIGN PATENT DOCUMENTS

CN           111277391           6/2020
JP           2019103057          6/2019
(Continued)

OTHER PUBLICATIONS

International Search Report for PCT Patent Application No. PCT/CN2020/119785; Oct. 2, 2020.
(Continued)

*Primary Examiner* — Christopher R Crompton
(74) *Attorney, Agent, or Firm* — Kowert, Hood, Munyon, Rankin & Goetzel, P.C.

(57)                    ABSTRACT

This disclosure relates to techniques for performing physical uplink shared channel transmissions with improved reliability in a wireless communication system. The wireless device may establish a wireless link with a cellular base station. The wireless device may receive uplink data transmission configuration information from the cellular base station. The uplink data transmission configuration information may configure an uplink data transmission to multiple transmission-reception-points. The wireless device may perform the uplink data transmission to the multiple transmission-reception-points.

20 Claims, 6 Drawing Sheets

(58) Field of Classification Search
USPC ........................................................ 370/329
See application file for complete search history.

(56) References Cited

U.S. PATENT DOCUMENTS

| | | | | |
|---|---|---|---|---|
| 2019/0215857 | A1 | 7/2019 | Lin | |
| 2019/0306924 | A1 | 10/2019 | Zhang | |
| 2019/0349964 | A1 | 11/2019 | Liou | |
| 2020/0100193 | A1 | 3/2020 | Cheng et al. | |
| 2020/0107353 | A1 | 4/2020 | Jung | |
| 2021/0036822 | A1* | 2/2021 | Lyu | H04L 5/0048 |
| 2021/0184819 | A1 | 6/2021 | Takeda | |
| 2022/0377706 | A1 | 11/2022 | Kittichokechai | |
| 2023/0092326 | A1 | 3/2023 | Gao | |
| 2023/0093264 | A1* | 3/2023 | Gao | H04W 52/16 |
| | | | | 370/329 |
| 2023/0124582 | A1* | 4/2023 | Frenne | H04L 5/0012 |
| | | | | 370/329 |
| 2023/0180276 | A1 | 6/2023 | Gerami | |

FOREIGN PATENT DOCUMENTS

| | | |
|---|---|---|
| JP | 2022517479 | 3/2022 |
| WO | 2015020604 | 2/2015 |
| WO | 2017181874 | 10/2017 |
| WO | 2020034442 | 2/2020 |
| WO | 2020044409 | 3/2020 |
| WO | 2020093362 | 5/2020 |
| WO | 2020143526 | 7/2020 |
| WO | 2020146536 | 7/2020 |

OTHER PUBLICATIONS

Extended European Search Report for EP Patent Application No. 20955871.7; Sep. 22, 2023.
Office Action for JP Patent Application No. 2023-520263; Dec. 22, 2023.
Samsung "Further Enhancements on MIMO for NR", 3GPP TSG RAN #89e RP-201469; Sep. 14, 2020.
Extended European Search Report for EP 24199083.7; Nov. 19, 2024.
Office Action for CN Patent Application No. 202080105765.5; Sep. 5, 2024.
Spreadtrum Communications "Discussion on CSI enhancement for multiple TRP/Panel transmission", 3GPP TSG RAN WG1#102-e R1-2006262, Aug. 17, 2020.
Office Action for Japanese Patent Application No. 2023-520263; Oct. 4, 2024.
Office Action for JP 2024-141179; Jun. 30, 2025.
Office Action for CN 202080105765.5; Apr. 18, 2025.
Office Action for KR 10-2023-7010973; Jun. 10, 2025.
Nokia "Summary of AI:8. 1.2.1 Enhancements for Multi-TRP URLLC for PUCCH and PUSCH" 3GPP TSG RAN WG1 #102-e R1-2007182; Aug. 17, 2020.
Intel "Multi-TRP enhancements for PDCCH, PUCCH and PUSCH" 3GPP TSG RAN WG1 #102-e R1-2005859; Aug. 17, 2020.
Office Action for CN 202080105765.5; Jul. 10, 2025.
Mediatek Inc. "Enhancements on Multi-TRP for PDCCH, PUCCH, PUSCH Document for : Discussion and Decision" 3GPP TSG RAN WG1 #102-e R1-2005621; Aug. 17, 2020.
Vivo "Discussion on enhancement on PDCCH, PUCCH, PUSCH in MTRP scenario" 3GPP TSG RAN WG1 #102-e R1-2005364; Aug. 17, 2020.
Notice of Grant for CN 20208015765.5; Nov. 10, 2025.
Notice of Allowance for KR 10-2023-7010973; Dec. 22, 2025.
ZTE "Further details on Multi-beam and Multi-TRP operation" 3GPP TSG RAN WG1 Meeting #102-e R1-2005461; Aug. 17, 2020.
Apple Inc. "On Multi-TRP Reliability Enhancement" 3GPP TSG-RAN WG1 Meeting #102-e R1-2006500; Aug. 17, 2020.
Oppo "Enhancements on multi-TRP and multi-panel transmission" 3GPP TSG RAN WG1 Meeting #99 R1-1911843; Nov. 18, 2019.
Nokia et al. "Enhancements on Multi-TRP/Panel Transmission" 3GPP TSG RAN WG1 #96bis Meeting R1-1905064; Apr. 8, 2019.

* cited by examiner

PERFORMING PHYSICAL UPLINK SHARED CHANNEL TRANSMISSIONS WITH IMPROVED RELIABILITY

PRIORITY CLAIM

This application is a continuation of U.S. patent application Ser. No. 17/437,676, entitled "Performing Physical Uplink Shared Channel Transmissions with Improved Reliability," filed Sep. 9, 2021, which is a national phase entry of PCT Application No. PCT/CN2020/119785, entitled "Performing Physical Uplink Shared Channel Transmissions with Improved Reliability," filed Oct. 2, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

Field

The present application relates to wireless communications, and more particularly to systems, apparatuses, and methods for performing physical uplink shared channel transmissions with improved reliability in a wireless communication system.

Description of the Related Art

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for performing physical uplink shared channel transmissions with improved reliability in a wireless communication system.

According to the techniques described herein, a wireless device may receive uplink data transmission configuration information that configures an uplink data transmission to multiple transmission-reception-points, and may perform the uplink data transmission to the multiple transmission-reception-points. The uplink data transmission may be any of a variety of types of uplink data transmissions, and some or all of the parameters used when transmitting to each of the configured transmission-reception-points may be configured independently for each transmission-reception-point.

Performing an uplink data transmission in such a manner may help improve the reliability of uplink data communications by making use of the potential for beam diversity that may be possible when uplink data can be provided to multiple transmission reception points, at least according to some embodiments.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
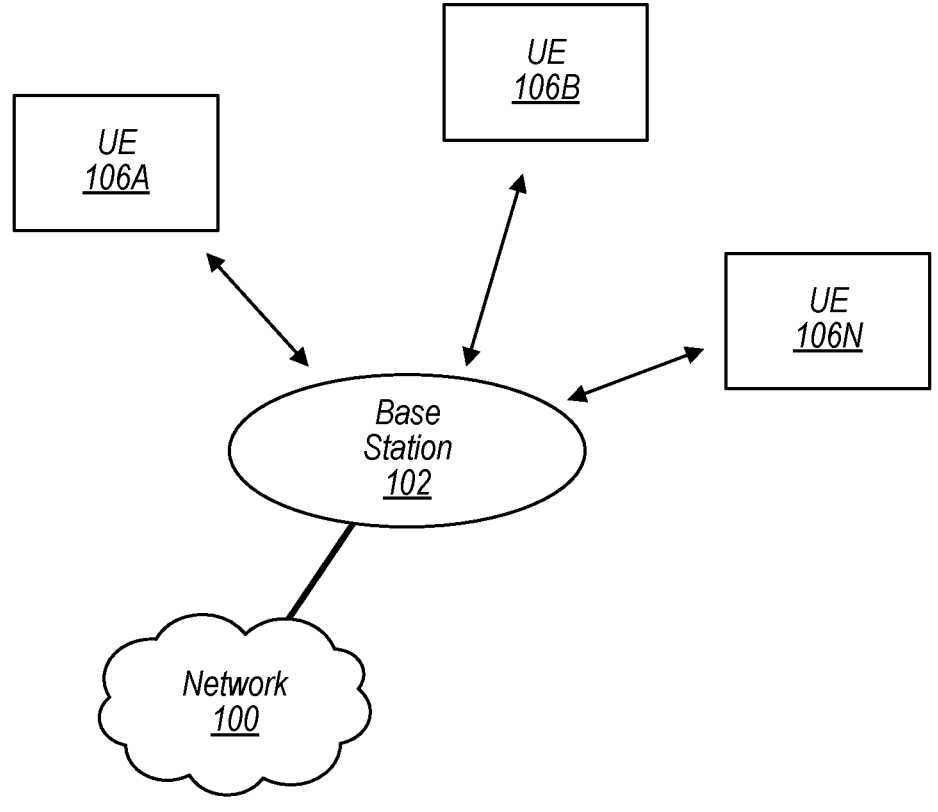
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
CSI: Channel State Information
CSI-RS: Channel State Information Reference Signals Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
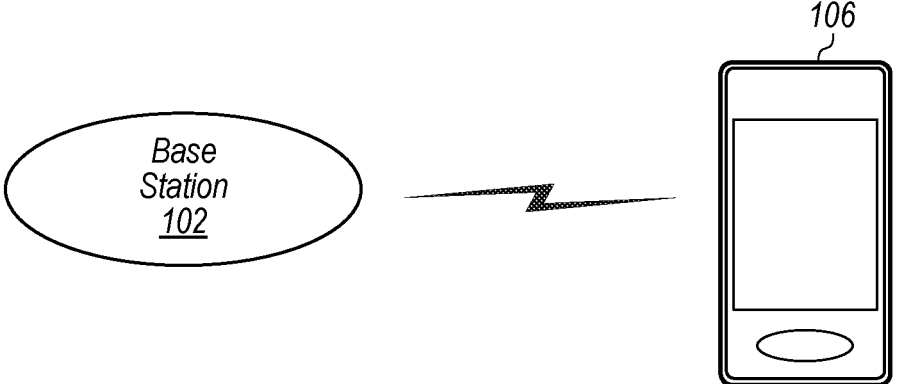
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N.

Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform robust uplink data transmission techniques, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
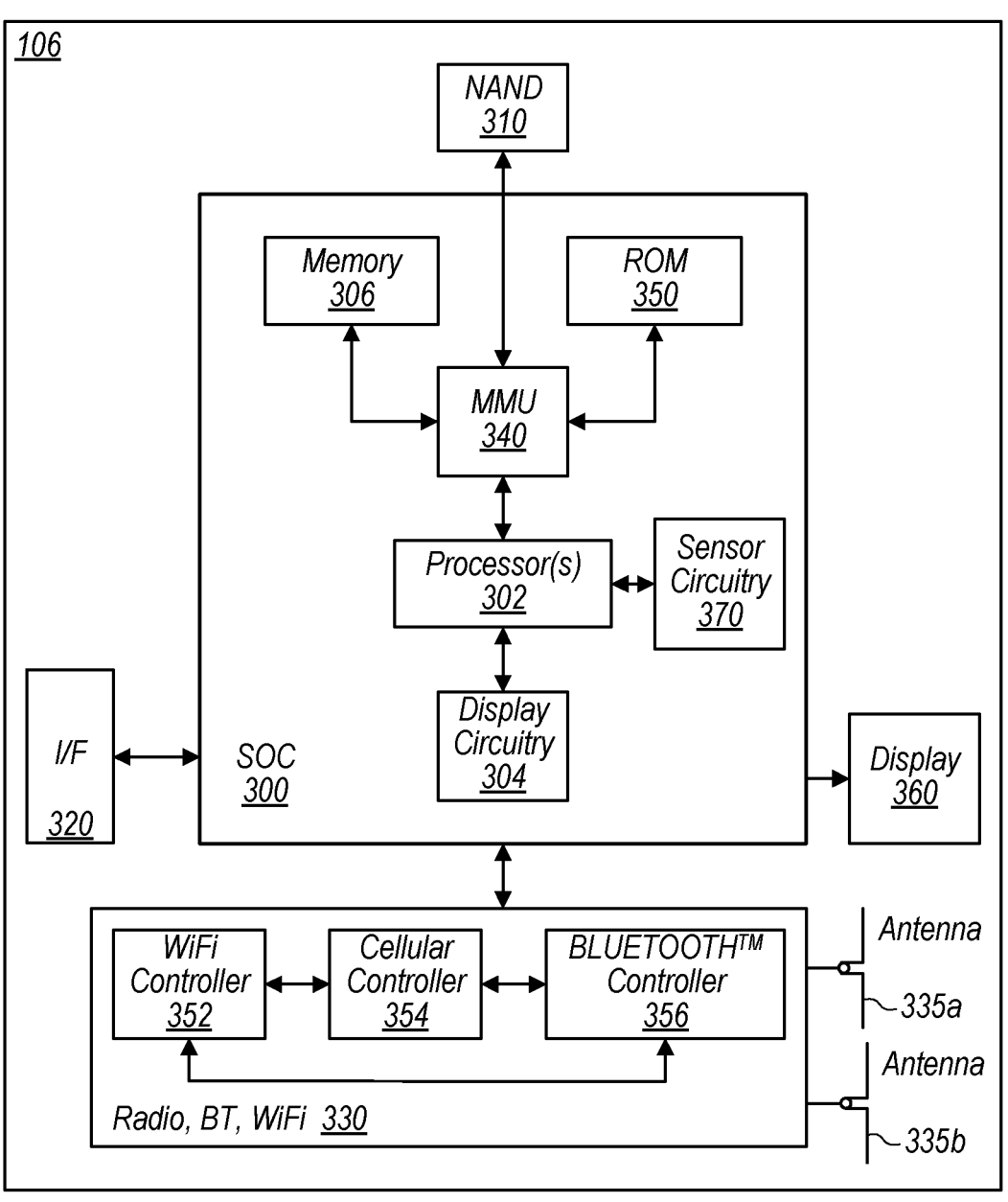
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash memory 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform uplink data transmission techniques with improved reliability, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform uplink data transmission techniques with improved reliability according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
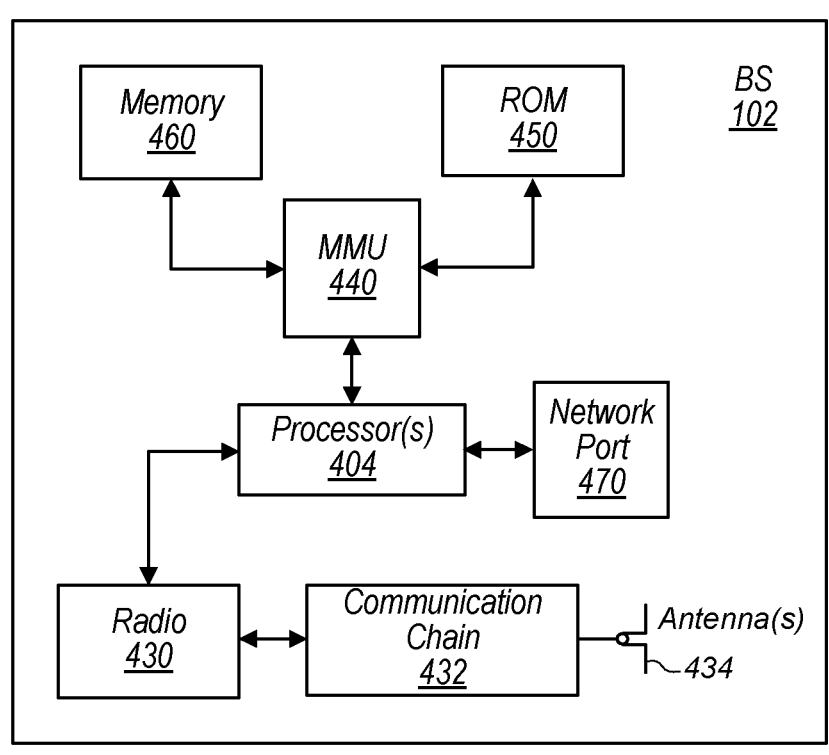
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Figure 5:
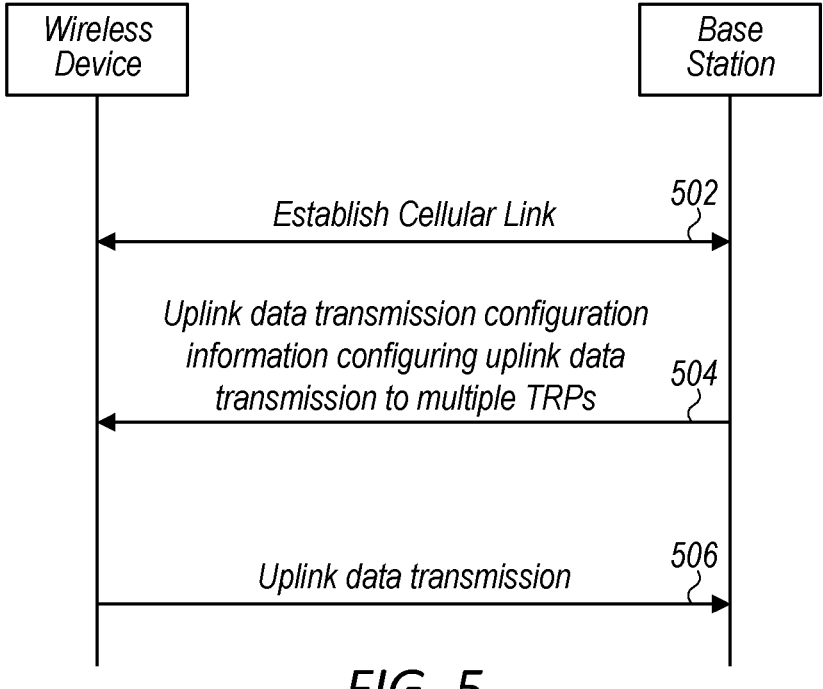
FIG. 5 is a flowchart diagram illustrating aspects of an exemplary possible method for providing physical uplink shared channel transmissions with improved reliability in a wireless communication system, according to some embodiments.

FIG. 5—Uplink Data Transmission Techniques with Improved Reliability

Wireless communication is being used for an increasingly broad set of use cases. For at least some such types of communications, the robustness and reliability of the communications may be of particular importance. Accordingly, it may be useful to expand the range of types of communications that can be performed in a highly robust and reliable manner.

One such area may include uplink data communications, and/or other communications that may be performed on the physical uplink shared channel (PUSCH) of a cellular communication system. In particular, it may be useful to provide techniques for performing uplink data communications that can benefit from multiple-input multiple-output (MIMO) capabilities and multi-beam diversity.

Accordingly, FIG. 5 is a flowchart diagram illustrating a method for performing uplink data communications with improved reliability in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/ or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 504, the cellular base station may provide uplink data transmission configuration information to the wireless device. The uplink data transmission configuration information may be provided using RRC control signaling, MAC signaling (e.g., MAC CE), downlink control information (DCI), or a combination thereof, among various possibilities. The uplink data transmission configuration information may configure uplink data transmission to multiple TRPs.

The uplink data transmission may be any of various types of uplink data transmissions. As one possibility, the uplink data transmission may be a configured grant (CG) PUSCH transmission, such as a 3GPP type 1 CG-PUSCH transmission (e.g., which may be configured by a RRC ConfiguredGrantConfig information element), or a 3GPP type 2 CG-PUSCH transmission (e.g., which may be activated or deactivated by DCI format 0_0, 0_1, or 0_2, with cyclic redundancy code (CRC) scrambled by configured scheduling radio network temporary identifier (CS-RNTI)). As another possibility, the uplink data transmission may be a dynamic grant (DG) PUSCH transmission, such as a 3GPP Type A PUSCH repetition or a 3GPP Type B PUSCH repetition. As a still further possibility, the uplink data transmission may be a 3GPP non codebook based (NCB) PUSCH transmission.

According to some embodiments, the uplink data transmission configuration information may configured a transmission pattern for performing repetitions of the uplink data transmission to the multiple TRPs. One such possible pattern could include transmitting individual repetitions to the multiple TRPs in an alternating manner Another such possible pattern could include transmitting sequences (e.g., of a specified length) of repetitions to the multiple TRPs in an alternating manner A still further possible pattern could include alternating to which TRP transmissions are performed in alternating slots.

According to some embodiments, the uplink data transmission configuration information includes information indicating one or more parameters for each TRP associated with the uplink transmission. For example, such information could include any or all of beam information, precoding information, pathloss reference signal information, target received power information, and/or a pathloss compensation factor, for each TRP associated with the uplink transmission.

Such configuration information may be provided in any of a variety of possible ways. For example, for a 3GPP type 1 CG-PUSCH transmission, some or all such parameters may be configured using various fields of a RRC information element configuring the CG-PUSCH transmission. Thus, in order to potentially indicate beam information for each TRP associated with the uplink transmission, it may be possible to provide separate beam configuration fields for each TRP, or to provide a single beam configuration field that includes a beam configuration index value associated with multiple beam configurations, among various possibilities. Similarly, in order to potentially indicate precoding information for each TRP associated with the uplink transmission, it may be possible to provide separate precoding configuration fields for each TRP, or to provide a single precoding configuration field that includes a precoding configuration index value associated with multiple precoding configurations, among various possibilities. Likewise, in order to potentially indicate pathloss reference signal information for each TRP associated with the uplink transmission, it may be possible to provide separate pathloss reference signal configuration fields for each TRP, or to provide a single pathloss reference signal configuration field that includes a pathloss reference signal configuration index value associated with multiple pathloss reference signal configurations, among various possibilities.

As another example, for 3GPP Type B DG PUSCH repetitions, it may be the case that various parameters may be independently configured by DCI with respect to each TRP. For example, any of all of a P0 parameter (target received power), an Alpha parameter (pathloss compensation factor), a Pathloss reference signal, a beam (e.g., in the form of TCI or sounding reference signal (SRS) resource indicator (SRI)), and/or a transmit precoding matrix indicator (TPMI) and number of layers could be indicated by DCI in such a scenario.

As previously noted herein, in some instances, the uplink data transmission configuration information may configure a 3GPP non codebook based (NCB) PUSCH transmission. In such a scenario, it may be the case that the uplink data transmission configuration information configures multiple SRS resource sets, where each SRS resource set is configured using a non zero power channel state information reference signal (NZP-CSI-RS). For example, a NZP-CSI-RS may be configured for each TRP to which the NCB PUSCH transmission is scheduled, and the NZP-CSI-RS may effectively configure a SRS resource set that logically maps to that TRP.

In some instances, it may be the case that two SRS resource indicator fields could be configured in DCI format 0_1 and 0_2, for NCB based PUSCH operation, when two SRS resource sets are configured and each maps to one TRP. In such a scenario, each SRS resource indicator field may map to one SRS resource set when NCB is configured.

As another possibility, the uplink data transmission configuration information may configure a SRS resource set, where the SRS resource set is associated with multiple NZP-CSI-RS resources. For example, a first portion of SRS resources of the SRS resource set may be associated with a first TRP, and a second portion of SRS resources of the SRS resource set may be associated with a second TRP. Note that in conjunction with such a scenario, it may be the case that the number of SRS resources that can be configured per SRS resource set could be increased (e.g., to support the possibility of including sufficient SRS resources for PUSCH transmission to multiple TRPs), for example from 4 to 8, as one possibility. It may be the case that the mapping of each SRS resource to an associated NZP-CSI-RS resource is configured by RRC control signaling, at least in some instances.

In 506, the wireless device may perform the uplink data transmission to the multiple TRPs. The uplink data transmission may be performed in accordance with the uplink data transmission configuration information, e.g., potentially including using different configuration parameters when transmitting to each of the configured TRPs. The uplink data transmission may be performed using the configured transmission pattern, e.g., if applicable.

Note that, at least according to some embodiments, it may be the case that a nominally scheduled PUSCH repetition may be truncated if there is a duplexing conflict (e.g., if a downlink communication is scheduled during the PUSCH repetition for a wireless device configured for half-duplex operation), and/or if the PUSCH repetition is scheduled across a slot boundary. In such a scenario, there may be a mechanism for determining to which TRP each actual repetition is transmitted, e.g., in accordance with a configured transmission pattern. For example, as one possibility, the wireless device may be configured to determine to which TRP to perform each actual uplink data transmission in accordance with the configured transmission pattern based on nominal repetitions of the uplink data transmission. As another possibility, the wireless device may be configured to determine to which TRP to perform each actual uplink data transmission in accordance with the configured transmission pattern based on actual repetitions of the uplink data transmission. As a still further possibility, the wireless device may be configured to determine to which TRP to perform each actual uplink data transmission in accordance with the configured transmission pattern based on a slot in which the uplink data transmission is performed.

The uplink data transmission may be received by the cellular network. For example, each TRP to which the uplink data transmission is scheduled to be performed may receive at least a portion (e.g., one or more repetitions) of the uplink data transmission from the wireless device.

Thus, the method of FIG. 5 may be used to provide a framework for configuring and performing uplink data transmissions more reliably in a cellular communication system. Such a framework may be particularly useful in supporting enhanced PUSCH reliability by making use of the potential availability of multiple TRPs and multiple wireless device antenna panels to provide increased beam diversity for uplink data communications, among other possible benefits, at least according to some embodiments.

FIGS. 6-10 and Additional Information

FIGS. 6-10 illustrate further aspects that might be used in conjunction with the method of FIG. 5 if desired. It should be noted, however, that the exemplary details illustrated in and described with respect to FIGS. 6-10 are not intended to be limiting to the disclosure as a whole: numerous variations and alternatives to the details provided herein below are possible and should be considered within the scope of the disclosure.

3GPP Release 16 supports multi-TRP design for improved physical downlink shared channel (PDSCH) performance. This support may include use of multiple DCI across up to 5 control resource sets (CORESETs) to schedule up to 2 PDSCHs. It may also be possible that a single DCI can schedule multiple PDSCHs, in several possible modes, including a spatial division multiplexing (SDM) mode with fully overlapped PDSCH, a frequency division multiplexing (FDM) mode with single transport block (TB), a FDM mode with 2 TB s, an intra-slot time division multiplexing (TDM) mode, and an inter-slot TDM mode.

3GPP Release 16 may also support type B physical uplink shared channel (PUSCH) repetitions for improved reliability. For example, in control signaling (e.g., in PUSCH-Allocation-r16 in PUSCH-TimeDomainResourceAllocationListPUSCH-r16), a parameter (e.g., numberOfRepetitions-r16) may be added in order to allow dynamic changes to the number of PUSCH repetitions via DCI. The nominal repetitions, if configured, may be performed back-to-back. When nominal repetitions would be performed across slot boundaries or in conflict with duplexing direction, the nominal PUSCH transmission may be truncated.

Further improvements to PUSCH reliability may be possible, e.g., by providing support for PUSCH transmissions to multiple TRPs. For example, techniques for configuring and performing configured grant (CG), dynamic grant (DG), and/or non codebook based (NCB) PUSCH transmission to multiple TRPs are described herein, which may help improve PUSCH reliability, at least in some instances.

According to some embodiments, it may be the case that there are two types of CG PUSCH supported in 3GPP communication. In 3GPP Type I CG-PUSCH, the CG-PUSCH may be configured by a RRC ConfiguredGrantConfig information element (IE). In 3GPP Type II CG-PUSCH, the CG-PUSCH may be activated or deactivated by DCI format 0_0, 0_1, or 0_2, with cyclic redundancy code (CRC) scrambled by a configured scheduling radio network temporary identifier (CS-RNTI).

For 3GPP Type I CG PUSCH, modifications to the manner in which RRC configuration is performed may be introduced to provide support for multi-TRP PUSCH operation. These modifications may include providing a mechanism to signal different precoding, beam, and/or pathloss reference signal for different TRPs. According to 3GPP TS 38.331, v.16.1.0, section 6.3.2, it may be the case that a ConfiguredGrantConfig information element can be used to configure uplink transmission without dynamic grant, and may include a rrc-ConfiguredUplinkGrant field. Such a field may include a precodingAndNumberOfLayers parameter, a srs-ResourceIndicator parameter, and a pathlossReferenceIndex parameter, which may be used to indicate precoding, beam, and pathloss reference signal for CG-PUSCH operation.

As one possibility for providing support for indicating different precoding for different TRPs in such an IE, an additional field (e.g., 'additional-precodingAndNumberOfLayers') could be introduced to configure the precoder for the second TRP, thus potentially allowing two different precoding configurations for two different TRPs. As another such possibility, RRC configuration may provide a list of precodingAndNumberOfLayers codepoints, where each precodingAndNumberOfLayers codepoint can contain 1 or 2 entries of uplink rank and transmitting precoding matrix indicator (TPMI), and the precodingAndNumberOfLayers parameter may be used to indicate a precodingAndNumberOfLayers codepoint.

As one possibility for providing support for indicating different beams for different TRPs in such an IE, an additional field (e.g., 'additional-srs-ResourceIndicator') could be introduced to configure the beam for the second TRP, thus potentially allowing two different beam configurations for two different TRPs. As another such possibility, RRC configuration may provide a list of SRS resource codepoints, where each SRS resource codepoint can contain 1 or 2 sets of SRS resources, and the srs-ResourceIndicator parameter may be used to indicate a SRS resource codepoint.

As one possibility for providing support for indicating different pathloss reference signals for different TRPs in such an IE, an additional field (e.g., 'additional-pathloss- ReferenceIndex') could be introduced to configure the path-loss reference signal for the second TRP, thus potentially allowing two different pathloss reference signal configurations for two different TRPs. As another such possibility, RRC configuration may provide a list of pathlossReferenceIndex codepoints, where each pathlossReferenceIndex can contain 1 or 2 pathloss reference signal configurations, and the pathlossReferenceIndex parameter may be used to indicate a pathlossReferenceIndex codepoint.

Figures 6, 7, 8:
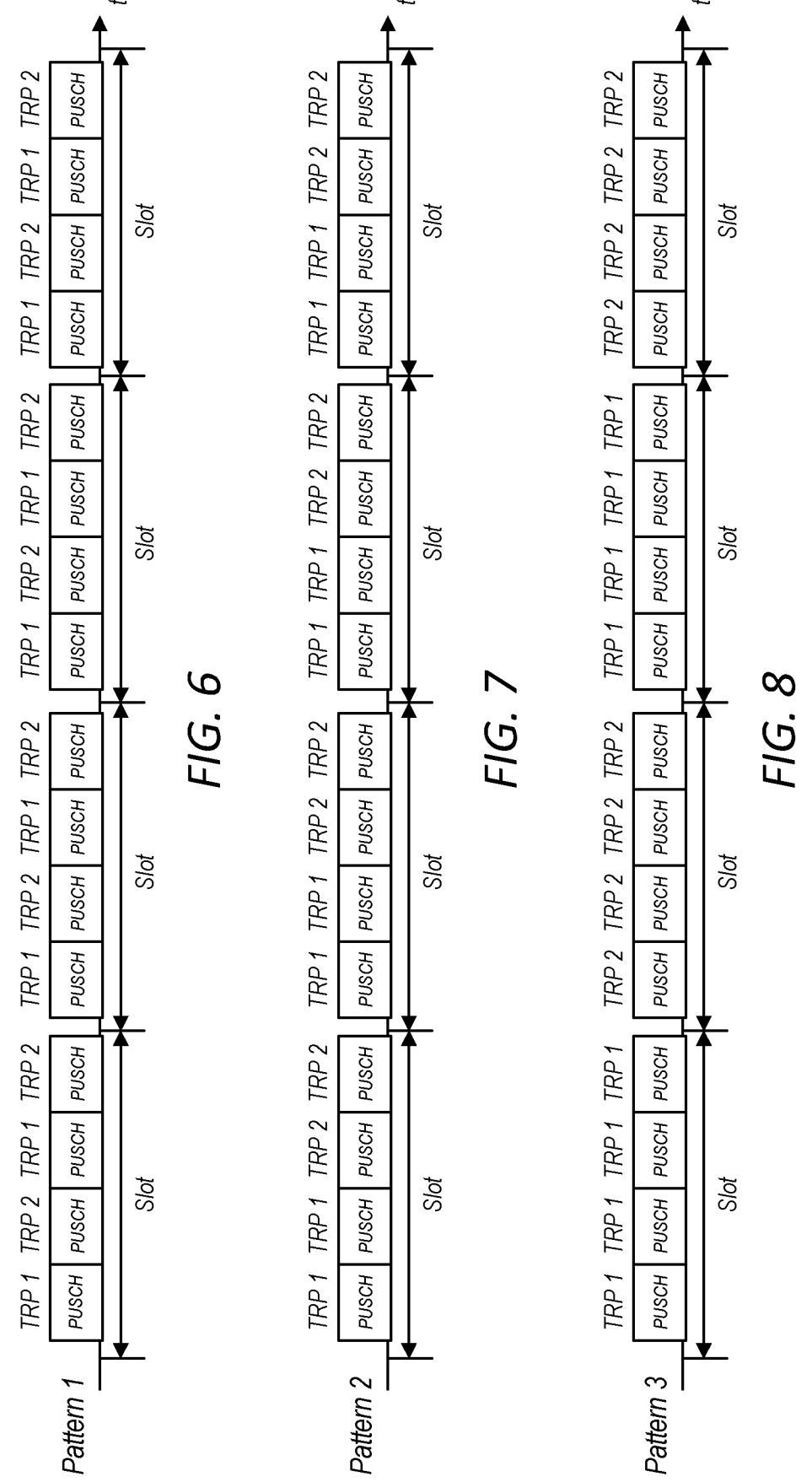
FIGS. 6-8 illustrate exemplary aspects of various possible transmission patterns that could be used for configured grant physical uplink shared channel transmissions, according to some embodiments.

For 3GPP Type I CG-PUSCH, when different beam, precoding, and/or pathloss reference signals are configured per TRP, there may be multiple possible mappings to the actual PUSCH transmissions. FIGS. 6-8 illustrate several such possible transmission patterns, according to some embodiments.

FIG. 6 illustrates an exemplary possible transmission pattern in which TRPs to which PUSCH transmissions are performed alternate in a per repetition occasion cyclic pattern, e.g., such that the TRP to which a PUSCH transmission is performed alternates on every transmission occasion.

FIG. 7 illustrates an exemplary possible transmission pattern in which TRPs to which PUSCH transmissions are performed alternate in a per repetition occasion sequential pattern, e.g., such that the TRP to which a PUSCH transmission is performed alternates after a sequence of PUSCH transmissions of a specified length is performed. In the illustrated example, the sequence length may include 2 PUSCH transmissions.

FIG. 8 illustrates an exemplary possible transmission pattern in which TRPs to which PUSCH transmissions are performed alternate in a per slot sequential pattern, e.g., such that the TRP to which a PUSCH transmission is performed alternates in each slot.

Note further that for type I CG-PUSCH, it may additionally or alternatively be possible for the powerControlLoop-ToUse and/or p0-PUSCH-Alpha parameters related to Open Loop Power Control (OLPC) to be independently configured for each TRP, at least according to some embodiments.

According to some embodiments, it may be possible to use similar techniques as described herein with respect to 3GPP Type I CG PUSCH operation for 3GPP Type A DG PUSCH operation, e.g., to transmit PUSCH repetitions to multiple TRPs.

For Type B DG PUSCH repetition, it may be possible for various parameters to be independently configured/indicated by DCI for each TRP. Such parameters may include any or all of P0 (e.g., the target received power), Alpha (e.g., the pathloss compensation factor), pathloss reference signal, beam used for transmission (e.g., in the form of transmission configuration indicator (TCI) or sounding reference signal (SRI) resource indicator), and/or TPMI and number of layers.

Figure 9:
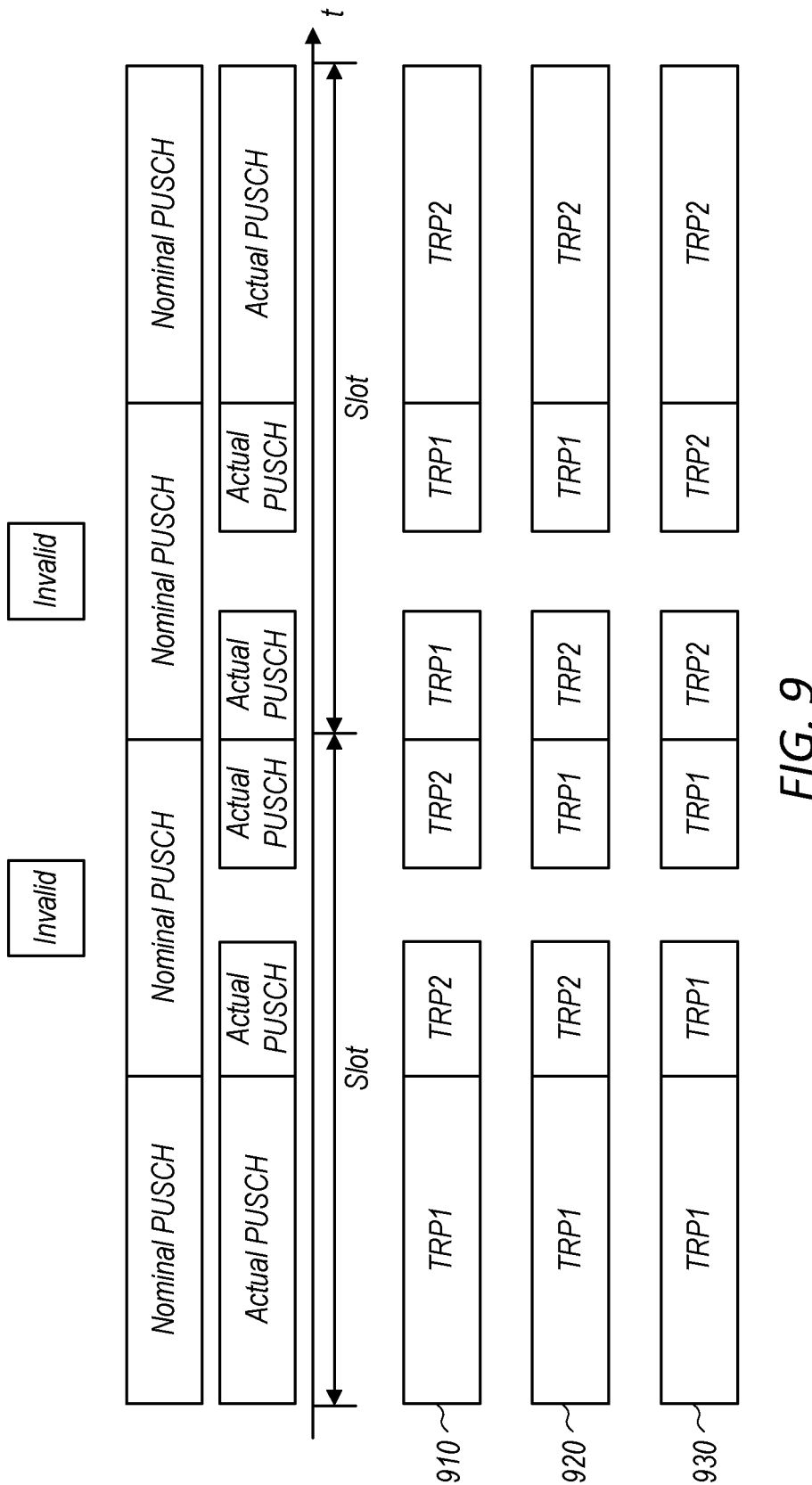
FIG. 9 illustrates various possible exemplary approaches to mapping TRP to repetition for dynamic grant physical uplink shared channel transmissions, according to some embodiments.

For such Type B DG PUSCH repetition, when one or more parameters are independently configured for each of multiple TRPs, there may be multiple possibilities for mapping nominal PUSCH repetitions to actual PUSCH transmissions, e.g., in view of possible truncation of a nominal PUSCH transmission due to duplexing direction conflict or crossing of slot boundaries by the nominal PUSCH transmission. FIG. 9 illustrates several such possible options that could be used to map nominal PUSCH repetitions to actual PUSCH transmissions, at least according to some embodiments.

As shown, in a first option 910, the mapping of to which TRP an actual PUSCH transmission is transmitted may be based on the nominal repetition. Thus, in this approach, the first actual PUSCH repetition may be transmitted to TRP1, the second and third actual PUSCH repetitions may be transmitted to TRP2, the fourth and fifth actual PUSCH repetitions may be transmitted to TRP1, and the 6th actual PUSCH repetition may be transmitted to TRP2.

In the second illustrated option 920, the mapping of to which TRP an actual PUSCH transmission is transmitted may be based on the actual repetition. Thus, in this approach, the first actual PUSCH repetition may be transmitted to TRP1, the second actual PUSCH repetition may be transmitted to TRP2, the third actual PUSCH repetition may be transmitted to TRP1, the fourth actual PUSCH repetition may be transmitted to TRP2, the fifth actual PUSCH repetition may be transmitted to TRP1, and the sixth actual PUSCH repetition may be transmitted to TRP2.

In the third illustrated option 930, the mapping of to which TRP an actual PUSCH transmission is transmitted may be based on the slot in which the PUSCH transmission is performed. Thus, in this approach, the first, second, and third actual PUSCH repetitions may be transmitted to TRP1, and the fourth, fifth, and sixth actual PUSCH repetitions may be transmitted to TRP2.

Figure 10:
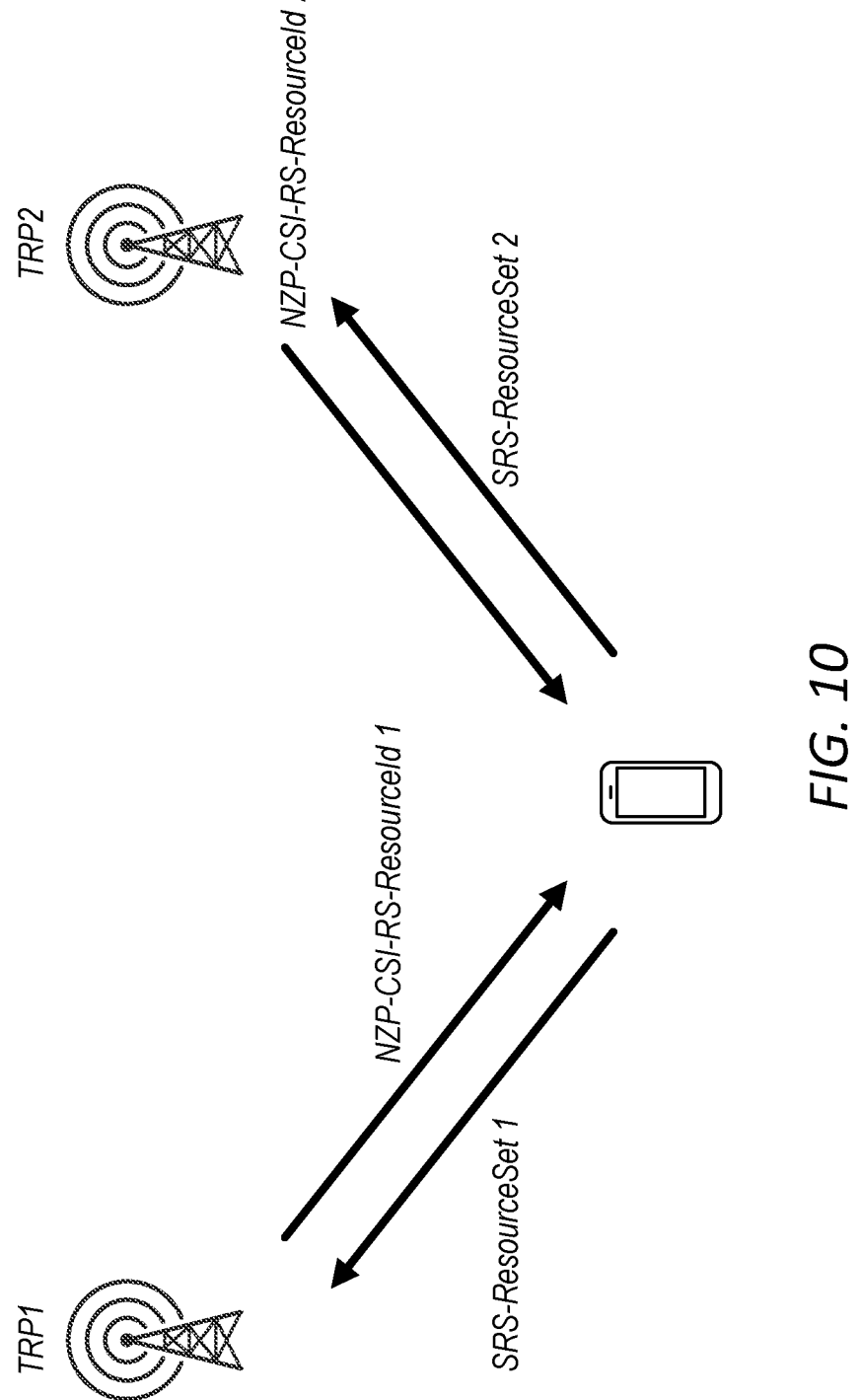
FIG. 10 illustrates exemplary aspects of possible non-codebook based physical uplink shared channel operation, according to some embodiments.

For NCB PUSCH operation, it may be possible to support multi-TRP PUSCH operation by configuring more than one SRS-ResourceSet, at least according to some embodiments. FIG. 10 illustrates aspects of such an approach, according to some embodiments. As shown, in the illustrated example, each SRS-ResourceSet logically maps to one TRP. Each SRS-ResourceSet can be configured with a different non-zero-power channel state information reference signal resource identifier (NZP-CSI-RS-ResourceId), each of which may be transmitted from a different TRP.

In some instances, for NCB PUSCH operation, when two SRS-ResourceSets are configured, each mapping to one TRP, it may be possible to configure two SRS resource indicator fields in 3GPP DCI Format 0_1 and 0_2. In such a scenario, each SRS resource indicator field may map to one SRS-ResourceSet with usage of "nonCodebook".

As a further possibility, for NCB PUSCH operation, it may be the case that a single SRS-ResourceSet can be configured, such that it can contain more than 1 associated NZP-CSI-RS-ResourceId. In such a scenario, it may be the case that the number of SRS resources that can be configured per SRS-ResourceSet can be increased, for example from 4 to 8. A mapping of each SRS-resource in the SRS-Resource-Set to the associated NZP-CSI-RS-ResourceId may be configured by RRC control signaling. Thus, it may also be possible to support multi-TRP NCB PUSCH operation using such a configuration.

In the following further exemplary embodiments are provided.

One set of embodiments may include a baseband processor configured to perform operations comprising: establishing a wireless link with a cellular base station; receiving uplink data transmission configuration information, wherein the uplink data transmission configuration information configures an uplink data transmission to multiple transmission-reception-points (TRPs); and performing the uplink data transmission to the multiple TRPs.

According to some embodiments, the uplink data transmission configuration information configures a 3GPP configured grant physical uplink shared channel (PUSCH) transmission.

According to some embodiments, the uplink data transmission configuration information configures a 3GPP dynamic grant physical uplink shared channel (PUSCH) transmission.

According to some embodiments, the uplink data transmission configuration information configures a 3GPP non codebook based physical uplink shared channel (PUSCH) transmission.

According to some embodiments, the uplink data transmission configuration information configures a transmission pattern for performing repetitions of the uplink data transmission to the multiple TRPs.

According to some embodiments, the uplink data transmission configuration information includes information indicating, for each TRP associated with the uplink transmission, one or more of: beam information; precoding information; pathloss reference signal information; target received power information; or a pathloss compensation factor.

Another set of embodiments may include a wireless device, comprising: an antenna; a radio operably coupled to the antenna; and a processor operably coupled to the radio; wherein the wireless device is configured to: establish a wireless link with a cellular base station; receive uplink data transmission configuration information, wherein the uplink data transmission configuration information configures an uplink data transmission to multiple transmission-reception-points (TRPs); and perform the uplink data transmission to the multiple TRPs.

According to some embodiments, the uplink data transmission configuration information includes beam information for each TRP associated with the uplink transmission, wherein the beam information for each TRP is indicated using one of: separate beam configuration fields for each TRP; or a single beam configuration field that includes a beam configuration index value associated with multiple beam configurations.

According to some embodiments, the uplink data transmission configuration information includes precoding information for each TRP associated with the uplink transmission, wherein the precoding information for each TRP is indicated using one of: separate precoding configuration fields for each TRP; or a single precoding configuration field that includes a precoding configuration index value associated with multiple precoding configurations.

According to some embodiments, the uplink data transmission configuration information includes pathloss reference signal information for each TRP associated with the uplink transmission, wherein the pathloss reference signal information for each TRP is indicated using one of: separate pathloss reference signal configuration fields for each TRP; or a single pathloss reference signal configuration field that includes a pathloss reference signal configuration index value associated with multiple pathloss reference signal configurations.

According to some embodiments, for each TRP associated with the uplink transmission, the uplink data transmission configuration information independently configures one or more of: target received power information; or a pathloss compensation factor.

According to some embodiments, the uplink data transmission configuration information configures a transmission pattern for performing repetitions of the uplink data transmission to the multiple TRPs, wherein according to the transmission pattern, individual repetitions are transmitted to the multiple TRPs in an alternating manner.

According to some embodiments, the uplink data transmission configuration information configures a transmission pattern for performing repetitions of the uplink data transmission to the multiple TRPs, wherein according to the transmission pattern, sequences of repetitions are transmitted to the multiple TRPs in an alternating manner.

According to some embodiments, the uplink data transmission configuration information configures a transmission pattern for performing repetitions of the uplink data transmission to the multiple TRPs, wherein according to the transmission pattern, transmissions are performed to alternating TRPs in alternating slots.

Yet another set of embodiments may include a method, comprising: establishing a wireless link with a cellular base station; receiving uplink data transmission configuration information, wherein the uplink data transmission configuration information configures an uplink data transmission to multiple transmission-reception-points (TRPs); and performing the uplink data transmission to the multiple TRPs.

According to some embodiments, the uplink data transmission configuration information configures a transmission pattern for determining to which TRP of the multiple TRPs to perform each repetition of the uplink data transmission, wherein when a nominal uplink data transmission is truncated due to duplexing conflict or being scheduled across a slot boundary, the method further comprises: determining to which TRP of the multiple TRPs to perform each actual uplink data transmission in accordance with the transmission pattern based on nominal repetitions of the uplink data transmission.

According to some embodiments, the uplink data transmission configuration information configures a transmission pattern for determining to which TRP of the multiple TRPs to perform each repetition of the uplink data transmission, wherein when a nominal uplink data transmission is truncated due to duplexing conflict or being scheduled across a slot boundary, the method further comprises: determining to which TRP of the multiple TRPs to perform each actual uplink data transmission in accordance with the transmission pattern based on actual repetitions of the uplink data transmission.

According to some embodiments, the uplink data transmission configuration information configures a transmission pattern for determining to which TRP of the multiple TRPs to perform each repetition of the uplink data transmission, wherein when a nominal uplink data transmission is truncated due to duplexing conflict or being scheduled across a slot boundary, the method further comprises: determining to which TRP of the multiple TRPs to perform each actual uplink data transmission in accordance with the transmission pattern based on a slot in which the uplink data transmission is performed.

According to some embodiments, the uplink data transmission configuration information configures a non-codebook based (NCB) physical uplink shared channel (PUSCH) transmission, wherein the uplink data transmission configuration information configures multiple sounding reference signal resource sets, wherein each sounding reference signal resource set is configured using a non zero power channel state information reference signal.

According to some embodiments, the uplink data transmission configuration information configures a non-codebook based (NCB) physical uplink shared channel (PUSCH) transmission, wherein the uplink data transmission configuration information configures a sounding reference signal resource set, wherein the sounding reference signal resource set is associated with multiple non zero power channel state information reference signals, wherein a first portion of sounding reference signal resources of the sounding reference signal resource set are associated with a first TRP, wherein a second portion of sounding reference signal resources of the sounding reference signal resource set are associated with a second TRP.

A further set of embodiments may include an apparatus, comprising a processor configured to cause a cellular base station to: establish a wireless link with a wireless device; provide uplink data transmission configuration information to a wireless device, wherein the uplink data transmission configuration information configures an uplink data transmission to multiple transmission-reception-points (TRPs); and receive at least a portion of the uplink data transmission to the multiple TRPs.

According to some embodiments, the uplink data transmission configuration information configures a 3GPP configured grant physical uplink shared channel (PUSCH) transmission.

According to some embodiments, the uplink data transmission configuration information configures a 3GPP dynamic grant physical uplink shared channel (PUSCH) transmission.

According to some embodiments, the uplink data transmission configuration information configures a 3GPP non codebook based physical uplink shared channel (PUSCH) transmission.

According to some embodiments, the uplink data transmission configuration information configures a transmission pattern for performing repetitions of the uplink data transmission to the multiple TRPs.

According to some embodiments, the uplink data transmission configuration information includes information indicating, for each TRP associated with the uplink transmission, one or more of: beam information; precoding information; pathloss reference signal information; target received power information; or a pathloss compensation factor.

A yet further set of embodiments may include a cellular base station, comprising: an antenna; a radio operably coupled to the antenna; and a processor operably coupled to the radio; wherein the cellular base station is configured to: establish a wireless link with a wireless device; provide uplink data transmission configuration information to a wireless device, wherein the uplink data transmission configuration information configures an uplink data transmission to multiple transmission-reception-points (TRPs); and receive at least a portion of the uplink data transmission to the multiple TRPs.

According to some embodiments, the uplink data transmission configuration information includes beam information for each TRP associated with the uplink transmission, wherein the beam information for each TRP is indicated using one of: separate beam configuration fields for each TRP; or a single beam configuration field that includes a beam configuration index value associated with multiple beam configurations.

According to some embodiments, the uplink data transmission configuration information includes precoding information for each TRP associated with the uplink transmission, wherein the precoding information for each TRP is indicated using one of: separate precoding configuration fields for each TRP; or a single precoding configuration field that includes a precoding configuration index value associated with multiple precoding configurations.

According to some embodiments, the uplink data transmission configuration information includes pathloss reference signal information for each TRP associated with the uplink transmission, wherein the pathloss reference signal information for each TRP is indicated using one of: separate pathloss reference signal configuration fields for each TRP; or a single pathloss reference signal configuration field that includes a pathloss reference signal configuration index value associated with multiple pathloss reference signal configurations.

According to some embodiments, for each TRP associated with the uplink transmission, the uplink data transmission configuration information independently configures one or more of: target received power information; or a pathloss compensation factor.

According to some embodiments, the uplink data transmission configuration information configures a transmission pattern for performing repetitions of the uplink data transmission to the multiple TRPs, wherein according to the transmission pattern, individual repetitions are transmitted to the multiple TRPs in an alternating manner.

According to some embodiments, the uplink data transmission configuration information configures a transmission pattern for performing repetitions of the uplink data transmission to the multiple TRPs, wherein according to the transmission pattern, sequences of repetitions are transmitted to the multiple TRPs in an alternating manner.

According to some embodiments, the uplink data transmission configuration information configures a transmission pattern for performing repetitions of the uplink data transmission to the multiple TRPs, wherein according to the transmission pattern, transmissions are performed to alternating TRPs in alternating slots.

A still further set of embodiments may include a method, comprising: by a cellular base station: establishing a wireless link with a wireless device; providing uplink data transmission configuration information to a wireless device, wherein the uplink data transmission configuration information configures an uplink data transmission to multiple transmission-reception-points (TRPs); and receiving at least a portion of the uplink data transmission to the multiple TRPs.

According to some embodiments, the uplink data transmission configuration information configures a transmission pattern for determining to which TRP of the multiple TRPs to perform each repetition of the uplink data transmission, wherein according to the transmission pattern, when a nominal uplink data transmission is truncated due to duplexing conflict or being scheduled across a slot boundary, to which TRP of the multiple TRPs to perform each actual uplink data transmission is determined based on a nominal repetition of the uplink data transmission.

According to some embodiments, the uplink data transmission configuration information configures a transmission pattern for determining to which TRP of the multiple TRPs to perform each repetition of the uplink data transmission, wherein according to the transmission pattern, when a nominal uplink data transmission is truncated due to duplexing conflict or being scheduled across a slot boundary, to which TRP of the multiple TRPs to perform each actual uplink data transmission is determined based on an actual repetition of the uplink data transmission.

According to some embodiments, the uplink data transmission configuration information configures a transmission pattern for determining to which TRP of the multiple TRPs to perform each repetition of the uplink data transmission, wherein according to the transmission pattern, when a nominal uplink data transmission is truncated due to duplexing conflict or being scheduled across a slot boundary, to which TRP of the multiple TRPs to perform each actual uplink data transmission is determined based on a slot in which the uplink data transmission is performed.

According to some embodiments, the uplink data transmission configuration information configures at least a portion of a non-codebook based (NCB) physical uplink shared channel (PUSCH) transmission, wherein the uplink data transmission configuration information configures a non zero power channel state information reference signal associated with a sounding reference signal resource set, wherein additional uplink data transmission configuration information configuring an additional non zero power channel state information reference signal associated with an additional sounding reference signal resource set is also provided to the wireless device.

According to some embodiments, the uplink data transmission configuration information configures at least a portion of a non-codebook based (NCB) physical uplink shared channel (PUSCH) transmission, wherein the uplink data transmission configuration information configures a sounding reference signal resource set, wherein the sounding reference signal resource set is associated with multiple non zero power channel state information reference signals, wherein a first portion of sounding reference signal resources of the sounding reference signal resource set are associated with a first TRP, wherein a second portion of sounding reference signal resources of the sounding reference signal resource set are associated with a second TRP.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a device to perform any or all of the elements of any of the preceding examples.

Another exemplary set of embodiments may include a baseband processor configured to perform operations comprising any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:

receiving, in radio resource control (RRC) message, uplink data transmission configuration information including a Type 1 configured uplink grant configuration comprising multiple sounding reference signal (SRS) resource indicators for multiple transmission and reception point (TRP) operation, wherein each SRS resource indicator maps to one SRS resource set of multiple SRS resource sets, and wherein the Type 1 configured uplink grant configuration comprises multiple pathlossReferenceIndex values; and performing Type 1 configured uplink grant uplink data transmission to multiple TRPs based on the multiple SRS resource indicators in the RRC message.

2. The method of claim 1, wherein the Type 1 configured uplink grant configuration comprises multiple precodingAndNumberOfLayers values corresponding to the multiple TRPs.

3. The method of claim 1, wherein the Type 1 configured uplink grant configuration comprises multiple powerControlLoopToUse and multiple p0-PUSCH-Alpha values corresponding to the multiple TRPs.

4. The method of claim 1, wherein said performing Type 1 configured uplink grant uplink data transmission comprises transmitting respective uplink transmission repetitions of a plurality of uplink transmissions according to different SRS indicators of the multiple SRS indicators.

5. The method of claim 4, wherein said transmitting respective uplink transmission repetitions is associated with a cyclic repetition pattern, wherein first and second SRS resource indicators of the multiple SRS indicators correspond to first and second uplink transmission repetitions, and wherein the cyclic repetition pattern repeats for additional uplink transmission repetitions.

6. The method of claim 4, wherein said transmitting respective uplink transmission repetitions includes a sequential repetition pattern, wherein a first SRS resource indicator of the multiple SRS indicators corresponds to first and second uplink transmission repetitions, wherein a second SRS resource indicator of the multiple SRS indicators corresponds to third and fourth uplink transmission repetitions, and wherein the sequential repetition pattern repeats for additional uplink transmission repetitions.

7. A processor configured to:
receive, in radio resource control (RRC) message, uplink data transmission configuration information including a Type 1 configured uplink grant configuration comprising multiple sounding reference signal (SRS) resource indicators for multiple transmission and reception point (TRP) operation, wherein the Type 1 configured uplink grant configuration comprises multiple powerControl-LoopToUse and multiple p0-PUSCH-Alpha values; and
perform Type 1 configured uplink grant uplink data transmission to multiple TRPs based on at least one of the multiple SRS resource indicators in the RRC message.

8. The processor of claim 7, wherein the Type 1 configured uplink grant configuration comprises multiple precodingAndNumberOfLayers values corresponding to the multiple TRPs.

9. The processor of claim 7, wherein the Type 1 configured uplink grant configuration comprises multiple pathlossReferenceIndex values corresponding to the multiple TRPs.

10. The processor of claim 7, wherein said performing Type 1 configured uplink grant uplink data transmission comprises transmitting respective uplink transmission repetitions of a plurality of uplink transmissions according to different SRS indicators of the multiple SRS indicators.

11. The processor of claim 10, wherein said transmitting respective uplink transmission repetitions is associated with a cyclic repetition pattern, wherein first and second SRS resource indicators of the multiple SRS indicators correspond to first and second uplink transmission repetitions, and wherein the cyclic repetition pattern repeats for additional uplink transmission repetitions.

12. The processor of claim 10, wherein said transmitting respective uplink transmission repetitions is associated with a sequential repetition pattern, wherein a first SRS resource indicator of the multiple SRS indicators corresponds to first and second uplink transmission repetitions, wherein a second SRS resource indicator of the multiple SRS indicators corresponds to third and fourth uplink transmission repetitions, and wherein the sequential repetition pattern repeats for additional uplink transmission repetitions.

13. The processor of claim 7, wherein the processor is a baseband processor.

14. A method, comprising:
transmitting, to a wireless device and in radio resource control (RRC) message, uplink data transmission configuration information including a Type 1 configured uplink grant configuration comprising multiple sounding reference signal (SRS) resource indicators for multiple transmission and reception point (TRP) operation, wherein each SRS resource indicator maps to one SRS resource set of multiple SRS resource sets, and wherein the Type 1 configured uplink grant configuration comprises multiple pathlossReferenceIndex values corresponding to the multiple TRPs; and
receiving, as one of multiple TRPs, a Type 1 configured uplink grant uplink data transmission from the wireless device, wherein the Type 1 configured uplink grant uplink data transmission is based on the multiple SRS resource indicators in the RRC message.

15. The method of claim 14, wherein the Type 1 configured uplink grant configuration comprises multiple precodingAndNumberOfLayers values corresponding to the multiple TRPs.

16. The method of claim 14, wherein the Type 1 configured uplink grant configuration comprises multiple powerControlLoopToUse and multiple p0-PUSCH-Alpha values corresponding to the multiple TRPs.

17. The method of claim 14, wherein the Type 1 configured uplink grant uplink data transmission is associated with respective uplink transmission repetitions of a plurality of uplink transmissions according to different SRS indicators of the multiple SRS indicators.

18. The method of claim 17, wherein said respective uplink transmission repetitions are associated with a cyclic repetition pattern, wherein first and second SRS resource indicators of the multiple SRS indicators correspond to first and second uplink transmission repetitions, and wherein the cyclic repetition pattern repeats for additional uplink transmission repetitions.

19. The method of claim 17, wherein said respective uplink transmission repetitions includes a sequential repetition pattern, wherein a first SRS resource indicator of the multiple SRS indicators corresponds to first and second uplink transmission repetitions, wherein a second SRS resource indicator of the multiple SRS indicators corresponds to third and fourth uplink transmission repetitions, and wherein the sequential repetition pattern repeats for additional uplink transmission repetitions.

20. The method of claim 19, wherein the sequential repetition pattern is performed such that a TRP to which a PUSCH transmission is performed alternates after a sequence of PUSCH transmissions of a specified length.

* * * * *